(No Model.)

E. J. ARMSTRONG.
SHAFT BEARING.

No. 547,654. Patented Oct. 8, 1895.

Witnesses.
T. A. Low
J. F. Beale.

Inventor.
Edwin J. Armstrong
by W. A. Redmond
Atty.

United States Patent Office.

EDWIN J. ARMSTRONG, OF OSWEGO, NEW YORK.

SHAFT-BEARING.

SPECIFICATION forming part of Letters Patent No. 547,654, dated October 8, 1895.

Application filed April 6, 1895. Serial No. 544,755. (No model.)

*To all whom it may concern:*

Be it known that I, EDWIN J. ARMSTRONG, a citizen of the United States, residing at Oswego, in the county of Oswego and State of New York, have invented certain new and useful Improvements in Shaft-Bearings; and I do hereby declare the following to be a full, clear, and exact description of the invention, such as will enable others skilled in the art to which it appertains to make and use the same.

This invention relates, generally, to shaft-bearings, and particularly to that form of bearing which consists of a single shell or tube within which the shaft revolves, and which are sometimes open on one side and arranged to be sprung together, in order to compensate for wear; and it has for its object to provide a suitable means of adjusting this form of shaft-bearing to accurately fit the shaft and to secure rigidity and permanency of adjustment against strains, acting either to open or close the shell; and it consists of the parts and combinations of parts hereinafter described and claimed.

Figure 1:
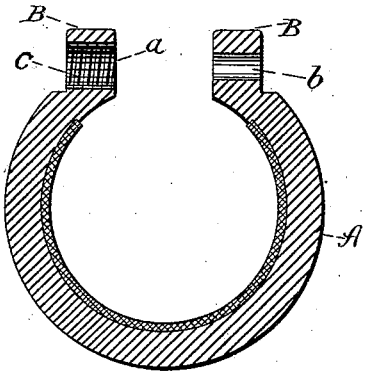
Figure 4:
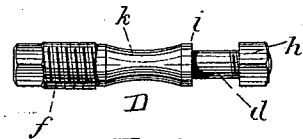
Figure 2:
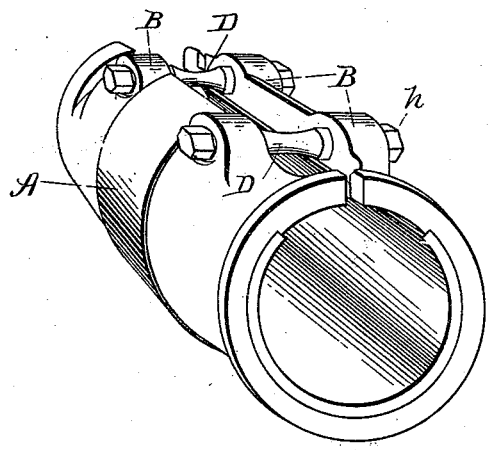
Figure 3:
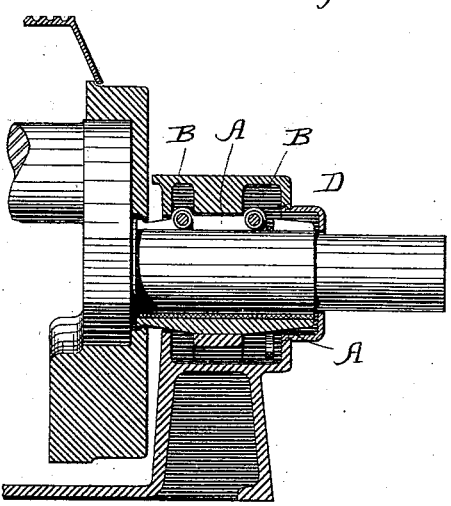

In the accompanying drawings, forming a part of this specification, Figure 1 is a vertical section through my improved bearing, taken on a line through the screw-holes therein; Fig. 2, a perspective of the same; Fig. 3, a vertical cross-section through an engine-shaft mounted in my improved bearings, and Fig. 4 a detail view of one of the adjusting-screws.

Similar letters refer to similar parts in all the views.

The bearing consists of a shell A, split lengthwise and formed with lugs B at one or more points thereon, two sets of lugs being shown in the drawings, arranged in pairs. Holes $a$ $b$ are formed in the lugs for the reception of the adjusting-screw D, and one lug of each pair is formed with screw-threads, as indicated at $c$. The adjusting-screw D is formed with screw-threads at $f$ to closely fit those at $c$ in the lug, and the smaller portion $d$ of the adjusting-screw is arranged to fit the hole $b$ of the lug, and the end of the screw is threaded to receive the nut $h$, and a shoulder $i$ is formed thereon. The adjusting-screw may be reduced at $k$ to conform to the shape of the shaft. When the shell has been adjusted to the desired position by the screw D, the tightening of nut $h$ will cause the lug to be gripped between the nut and the shoulder $i$, thus locking the adjusting-screw fast and preventing the lugs from being sprung to or from each other. By slightly loosening nut $h$ the adjusting-screw may be turned and any desired adjustment made, which adjustment may be preserved by again tightening nut $h$. Although the hole $b$ and a portion $d$ of the adjusting-screw are shown as smaller than hole $a$, it is evident that they may be larger instead and that the shoulder $i$ may be on the outside instead of between the lugs and nut $h$ be between instead of being outside of the lugs, as shown. It will also be evident that the shoulder $i$ may be replaced by a nut similar to nut $h$ and the lug B be gripped between the two nuts with equally good results. Therefore I do not desire to be limited to the exact construction and arrangement of parts shown, as it is obvious the scope of my invention includes such changes in construction and arrangement of parts as set forth above.

Having thus described my invention, what I claim as new, and desire to secure by Letters Patent, is—

A shaft-bearing, consisting of a metal shell split lengthwise on one side and formed at each side of said split with perforated lugs arranged opposite each other, one lug of each pair being screw-threaded, a screw for each pair of lugs for adjusting said split shell to the shaft, and means, gripping one lug of each pair, for locking the screws in their adjusted position, substantially as described.

In testimony whereof I affix my signature in presence of two witnesses.

EDWIN J. ARMSTRONG.

Witnesses:
SCHUYLER J. HARRIS,
THOMAS L. BRADFORD.